United States Patent Office 2,928,883
Patented Mar. 15, 1960

2,928,883
PRODUCTION OF HALONITROETHANES

Gustave B. Bachman, West Lafayette, Ind., and Ted J. Logan, Cincinnati, Ohio, assignors to Purdue Research Foundation, West Lafayette, Ind., a corporation of Indiana No Drawing. Application June 20, 1958
Serial No. 743,494

9 Claims. (Cl. 260—644)

Our invention relates to the production of halonitroethanes and more particularly it relates to the liquid phase halonitration of haloethylenes to produce halonitroethanes having at least one halogen beta to the carbon carrying the nitro radical.

Unsubstituted olefins have previously been shown to react with mixtures of halogens and dinitrogen tetroxide to form the corresponding beta-haloalkyl nitrates (G. B. Bachman and T. J. Logan, J. Org. Chem., 21, 1467 (1956)). We have now discovered that halogen substituted olefins, in particular, vinyl chloride, vinyl bromide, vinylidene chloride, etc., react with these same halogen-dinitrogen tetroxide mixtures to produce nitroethanes having at least one halogen beta to the carbon carrying the nitro radical. The different products obtained in going from an unsubstituted olefin such as ethylene to a substituted olefin such as vinyl chloride apparently arises from an unexpected difference in the mechanism of the attack on the double bond.

Our process for the production of nitroethanes having at least one halogen beta to the carbon carrying the nitro radical consists essentially of adding a halogenated ethylene to a solution of liquid dinitrogen tetroxide and chlorine, bromine or iodine. The reaction may be carried out utilizing the liquid dinitrogen tetroxide as a solvent for the halogen, or we may use a neutral halogenated solvent such as chloroform or carbon tetrachloride, or a liquid nitroalkane or other solvent which can advantageously be employed as a solvent for both the liquid dinitrogen tetroxide and the halogen, and which does not react under the conditions employed. When the solution will no longer absorb the halogenated ethylene, the products are water extracted, dried, and fractionally distilled at reduced pressures to remove any of the products formed in the reaction.

In carrying out our process we can use vinyl chloride, vinyl bromide, and the corresponding di- and tri-halo substituted ethylenes such as 1,2-dichloroethylene, vinylidene chloride, trichloroethylene, dibromoethylene, vinylidene bromide, and tribromoethylene, dinitrogen tetroxide, and the halogens chlorine, bromine and iodine.

The reaction is carried out in the liquid phase at temperatures preferably ranging from —10° C. to +25° C. The reaction can be carried out by preparing a solution of the desired halogen in the dinitrogen tetroxide and then passing the halogenated ethylene into the resulting mixture maintained at the desired reaction temperature. Preferably, however, we dissolve the required amounts of dinitrogen tetroxide and halogen in an inert solvent such as chloroform or carbon tetrachloride and then pass the halogenated ethylene into this solution until the reaction is complete. The solvent used should preferably be a good solvent for both the dinitrogen tetroxide and the halogen and should not be attacked by either the reactants or the reaction products and should be one from which the reaction products can be readily separated.

In general, we prefer to use approximately equal mole ratios of halogen to dinitrogen tetroxide. This ratio, however, can be varied somewhat. Mole ratios of dinitrogen tetroxide ranging from 0.2 to 0.5 mole to 0.1 to 0.5 mole of halogen have given satisfactory results. We prefer to use a solution containing a mole ratio of halogen to dinitrogen tetroxide of 1.0 or less.

The nitroethanes having at least one halogen beta to the carbon carrying the nitro radical of our invention are useful as solvents for various purposes, and particularly as soil fumigants, being readily sprayed onto or introduced into the soil in the manner and in the amount customarily employed in soil fumigation.

A better understanding of the nature of our invention can be had by reference to the following examples which illustrate our invention. We do not intend to be limited to the procedures, amounts and conditions set forth in the examples, but we intend for equivalents and variations obvious to those skilled in the art to be included within the scope of this specification and the attached claims.

Example I

Chlorine was passed into 221 ml. of carbon tetrachloride maintained at 0° C. until 17.7 g. (0.25 mole) had dissolved. Liquid dinitrogen tetroxide, 15.3 ml. (0.25 mole) was then added and the solution thoroughly mixed. Vinyl bromide was then passed into this solution for 180 minutes while the temperature was maintained at 0° C., by both internal and external cooling. The resultant light-brown solution was washed eight times with 50 ml. portions of water. The organic layer became almost yellow-orange. Removal of the solvent and fractionation gave 14.3 g. of 1,2-dichloro-1-bromoethane, B.P. 35° C. (3.0 mm.), and 39.0 g. of liquid, B.P. 47–8° C (1.0–2.0 mm.). This latter fraction was redistilled to give 1-bromo-1-chloro-2-nitroethane boiling at 48° C. (1.2 mm.) $n_D^{20}$ 1.5070, 82.8% conversion based on dinitrogen tetroxide.

*Analysis.*—Calculated for $C_2H_3ClBrNO_2$: C, 12.74; H, 1.60; N, 7.43. Found: C, 13.85; H, 1.73; N, 7.25.

The anthranilic acid derivative of the liquid melted with decomposition at 198–9° C.

Example II

Into the reactor was placed 30.7 ml. (0.05 mole) of dinitrogen tetroxide and 27.5 ml. (0.5 mole) of bromine in 200 ml. of chloroform. The solution was then cooled to 0° C. and vinyl chloride then passed into it until no more reaction was evident. At this point, the solution was clear brown and had a volume of 375 ml. The solution was allowed to warm to room temperature overnight and then had a bright green color. Several washings with ice water and removal of most of the solvent gave 116 ml. of a light yellow, highly lacrymatory liquid which yellowed the skin on contact. Distillation of 25 ml. of this liquid gave 11.8 ml. of 1,2-dibromo-1-chloroethane, B.P. 44° C. (4.0 mm.), and 16.1 g. of 1-bromo-1-chloro-2-nitroethane, B.P. 41° C. (0.5 mm.), $n_D^{20}$ 1.4980, $d_{20}^{20}$ 1.861. This represented a 79.5% conversion to crude product, based on dinitrogen tetroxide.

*Analysis.*—Calculated for $C_2H_3BrClNO_2$: C, 12.71; H, 1.59; N, 7.43. Found: C, 12.47; H, 1.89; N, 7.70.

Example III

Into the reactor was placed 25.4 g. (0.1 mole) of powdered iodine and 12.3 ml. (0.2 mole) of dinitrogen tetroxide in 600 ml. of chloroform. Vinyl chloride was then bubbled into the solution at a rate of approximately 0.9 g./minute while maintaining the solution at a temperature of approximately 15° C. The deep iodine colored solution became clear green after 15 minutes. This green solution was decanted from the unreacted iodine (5 g.). The solvent was removed and there remained 23.5 ml. of an orange liquid which weighed 42.8 g. A 2.0 ml. aliquot of this liquid gave 2.178 g. of anthranilic acid derivative, M.P. 198–200° (dec.). Using this weight of derivative, the conversion based on iodine to 1-chloro-1-iodo-2-nitroethane was 61.5%. Attempts to distill the product led only to decomposition with loss of iodine.

*Example IV*

A flask containing 442 ml. of carbon tetrachloride was immersed in a salt-ice mixture and chlorine (36 g., 0.5 mole) was introduced into the carbon tetrachloride at 0° C. until the solvent was saturated. Liquid dinitrogen tetroxide (61.4 ml., 1.0 mole) was added and then 96.7 g. (1.0 mole) of a mixture of cis- and trans-1,2-dichloroethylene slowly added over a period of two hours with stirring. The mixture was then allowed to stand at 0° C. for 12 hours and then washed with ice and water until a light yellow color resulted and finally dried with Drierite. Distillation yielded unreacted trans-1,2-dichloroethylene, 34.1 g. B.P. 48° C., 1,1,2-trichloro-2-nitroethane, 17.0 g. B.P. 32° C. (1.5 mm.), $n_D^{20}$ 1.4867, and a viscous yellow residue, 20.2 g., $n_D^{20}$ 1.4922.

*Example V*

Carbon tetrachloride (442 ml.) was cooled to 0° C. by a salt-ice mixture and saturated with chlorine (0.50 mole). Liquid dinitrogen tetroxide (61.4 ml., 1.0 mole) was added thereto followed by dropwise addition of vinylidene chloride (80 g., 0.83 mole) over a period of two hours. The mixture was allowed to stand without stirring for an additional five hours and then washed with ice and water until a pale blue color resulted and finally dried with Drierite. After the solvent had been removed by distillation 32.2 g. of 1,1,1-trichloro-2-nitroethane having a boiling point of 55° C. (2.0 mm.), and $n_D^{20}$ 1.4839 was obtained together with 39.3 g. of a viscous dark-yellow residue.

*Example VI*

Into a reaction flask was placed 1326 ml. of carbon tetrachloride and 106.5 g. (1.5 mole) of chlorine was then added, the temperature being maintained at 0° C. After 184.2 ml. (3.0 mole) of dinitrogen tetroxide had been added, trichloroethylene (394.2 g., 3.0 mole) was slowly added over a period of two hours with stirring. The resulting mixture was allowed to stand for 66 hours after which it was washed with ice and water and dried with Drierite. Following solvent removal, distillation gave 1,1,2-trichloro-2-nitroethylene, 26.2 g., B.P. 37° C. (5.5 mm.), $n_D^{23}$ 1.5095; 1,1,2,2-tetrachloro-2-nitroethane 26.8 g., B.P. 50° C. (4.0 mm.), $n_D^{23}$ 1.4965; and dark red-brown viscous residue (186.7 g.)

Now having described our invention, what we claim is:

1. In a process for the halonitration of halogenated ethylenes, the step which comprises reacting in the liquid phase at temperatures ranging from −10° C. to +25° C. a material selected from the group consisting of chlorinated ethylenes and brominated ethylenes with dinitrogen tetroxide and a halogen selected from the group consisting of bromine, chlorine and iodine.

2. The process of claim 1 wherein said halonitration is effected in the presence of an inert solvent.

3. The process of claim 1 wherein the halogenated ethylene is slowly added to a mixture of dinitrogen tetroxide and a halogen selected from the group consisting of bromine, chlorine and iodine.

4. In a process for the production of 1-bromo-1-chloro-2-nitroethane by the halonitration of vinyl chloride, the step which comprises slowly adding vinyl chloride to a solution of dinitrogen tetroxide and bromine in carbon tetrachloride while maintaining the reaction mixture at a temperature of approximately 0° C.

5. In a process for the production of 1-bromo-1-chloro-2-nitroethane, by the halonitration of vinyl bromide, the step which comprises slowly adding vinyl bromide to a mixture of dinitrogen tetroxide and chlorine in carbon tetrachloride while maintaining the solution at a temperature of approximately 0° C.

6. In a process for the production of 1-chloro-1-iodo-2-nitroethane by the halonitration of vinyl chloride, the step which comprises slowly adding vinyl chloride to a mixture of dinitrogen tetroxide and iodine in chloroform while maintaining the reaction mixture at a temperature of approximately 15° C.

7. In a process for the production of 1,1,2-trichloro-2-nitroethane by the halonitration of 1,2-dichloroethylene, the step which comprises slowly adding 1,2-dichloroethylene to a mixture of dinitrogen tetroxide and chlorine in carbon tetrachloride while maintaining the reaction mixture at a temperature of approximately 0° C.

8. In a process for the production of 1,1,1-trichloro-2-nitroethane by the halonitration of vinylidene chloride, the step which comprises slowly adding vinylidene choride to a mixture of dinitrogen tetroxide and chlorine in carbon tetrachloride while maintaining the temperature of the reaction mixture at approximately 0° C.

9. In a process for the production of 1,1,2,2-tetrachloro-2-nitroethane by the halonitration of trichloroethylene, the step which comprises slowly adding trichloroethylene to a mixture of dinitrogen tetroxide and chlorine in carbon tetrachloride while maintaining the temperature of the reaction mixture at approximately 0° C.

References Cited in the file of this patent

FOREIGN PATENTS 58,977     Netherlands _____ Feb. 15, 1947

OTHER REFERENCES

Stevens et al.: "J.A.C.S.," 80, 338–39, Jan. 20, 1958.